(12) United States Patent
Deforet et al.

(10) Patent No.: US 11,572,184 B2
(45) Date of Patent: *Feb. 7, 2023

(54) FRONT ENGINE ATTACHMENT SYSTEM FOR AN AIRCRAFT ENGINE, HAVING ROD SYSTEMS WITH TWO RODS

(71) Applicant: Airbus Operations SAS, Toulouse (FR)

(72) Inventors: Thomas Deforet, Toulouse (FR); Rémi Lansiaux, Toulouse (FR); Olivier Dubois, Toulouse (FR); Jacky Puech, Toulouse (FR)

(73) Assignee: Airbus Operations SAS, Toulouse (FR)

( * ) Notice: Subject to any disclaimer, the term of this patent is extended or adjusted under 35 U.S.C. 154(b) by 256 days.

This patent is subject to a terminal disclaimer.

(21) Appl. No.: 16/878,006

(22) Filed: May 19, 2020

(65) Prior Publication Data

US 2020/0385131 A1    Dec. 10, 2020

(30) Foreign Application Priority Data

May 21, 2019 (FR) ...................................... 1905337

(51) Int. Cl.
*B64D 27/26* (2006.01)
(52) U.S. Cl.
CPC ........ *B64D 27/26* (2013.01); *B64D 2027/264* (2013.01)
(58) Field of Classification Search
CPC .......................... B64D 27/26; B64D 2027/264
See application file for complete search history.

(56) References Cited

U.S. PATENT DOCUMENTS

| 5,474,258 A | 12/1995 | Taylor et al. |
| 6,474,597 B1 * | 11/2002 | Cazenave ............... B64D 27/26 244/54 |
| 2003/0025033 A1 | 2/2003 | Levert et al. |

(Continued)

FOREIGN PATENT DOCUMENTS

| EP | 1281615 A1 | 2/2003 |
| EP | 2754612 A1 | 7/2014 |

(Continued)

OTHER PUBLICATIONS

French Search Report; priority document.

*Primary Examiner* — Richard Green
*Assistant Examiner* — Steven J Shur
(74) *Attorney, Agent, or Firm* — Greer, Burns & Crain, Ltd.

(57) ABSTRACT

A front engine attachment system for an engine of an aircraft, the front engine attachment system having an engine pylon having, in its front part, a frontal part having an attachment wall that has a front face, and a front engine attachment having a beam that is fixed against the front face and to which is fixed, on either side of a median plane, a rod system, wherein each rod system is fixed to the beam in an articulated manner by at least one first connection point, and is configured to be fixed to a front part of the engine in an articulated manner by at least one second connection point. Such a front engine attachment system thus has rod systems having two rods, allowing the shape of the rods and the shape of the beam to be simplified.

3 Claims, 3 Drawing Sheets

(56) References Cited

U.S. PATENT DOCUMENTS

| | | | |
|---|---|---|---|
| 2008/0272229 A1* | 11/2008 | Lafont | B64D 27/26 244/54 |
| 2014/0183297 A1 | 7/2014 | Brochard et al. | |
| 2014/0183298 A1* | 7/2014 | Brochard | B64D 27/26 244/54 |
| 2019/0135445 A1 | 5/2019 | Combes et al. | |
| 2020/0369395 A1* | 11/2020 | Deforet | B64D 27/26 |

FOREIGN PATENT DOCUMENTS

| | | |
|---|---|---|
| EP | 3483069 A1 | 5/2019 |
| WO | 9311041 A1 | 6/1993 |

* cited by examiner

FRONT ENGINE ATTACHMENT SYSTEM FOR AN AIRCRAFT ENGINE, HAVING ROD SYSTEMS WITH TWO RODS

CROSS-REFERENCES TO RELATED APPLICATIONS

This application claims the benefit of the French patent application No. 1905337 filed on May 21, 2019, the entire disclosures of which are incorporated herein by way of reference.

FIELD OF THE INVENTION

The present invention relates to a front engine attachment system for an aircraft engine, and to an aircraft having at least one such front engine attachment.

BACKGROUND OF THE INVENTION

An aircraft conventionally has at least one engine, in particular a jet engine. Beneath each wing, and for each engine, the aircraft has an engine pylon that is fixed to the structure of the wing and that extends below the wing, and the engine is suspended beneath the engine pylon.

The engine is fixed to the engine pylon by way of an engine attachment system comprising a front engine attachment and a rear engine attachment.

The front engine attachment has, for example, a beam that is fixed to a front face of the engine pylon and two rods that are fixed between the beam and a front casing of the engine. Each rod is equipped with ball joints that are made up of two cut off and paired balls.

Each rod and the beam define in combination a primary load path between the engine and the engine pylon, so as to withstand the loads of the engine under normal operating conditions of the engine.

Such a beam is a solid component, obtained by machining a component obtained by forging. The method for obtaining this beam is relatively long and complex.

Although such a beam is satisfactory from the point of view of its use, it is necessary to find a different architecture so as to make its manufacture and implementation easier.

The documents US-A-2014/183298, EP-A2 754 612, EP-A-1 281 615 and WO-A-93/11041 discloses attachment systems of the state of the art.

SUMMARY OF THE INVENTION

An object of the present invention is to propose a front engine attachment system allowing a simplification of the form of the rods and the form of the beam.

To this end, a front engine attachment system for an engine of an aircraft is proposed, the front engine attachment system having:
- an engine pylon having, in its front part, a frontal part having an attachment wall that has a front face, and
- a front engine attachment having a beam that is fixed against the front face and to which is fixed, on either side of a median plane, a rod system,
- wherein each rod system is fixed to the beam in an articulated manner by at least one first connection point, and is intended to be fixed to a front part of the engine in an articulated manner by at least one second connection point,
- wherein each rod system comprises a front rod and a rear rod, wherein each first connection point between the beam and a rod system takes the form of a clevis, wherein one wall of the clevis is made up of the front rod of the rod system, wherein another wall of the clevis is made up of the rear rod of the rod system, wherein the beam is disposed between the two rods, and wherein a pin passes through a bore in each rod and a bore in the beam,
- wherein the front engine attachment system has, for each rod system, a backup safety fixing point that is activated in the event of failure of a primary load path and that creates an auxiliary load path between the engine and the engine pylon, each backup safety fixing point being made up of a clevis provided in the engine and a pin that is fitted into bores in the clevis and that passes through a bore in the beam, of which the diameter is greater than the diameter of the pin.

Such a front engine attachment system thus has rod systems having two rods, allowing the shape of the rods and the shape of the beam to be simplified.

Advantageously, the beam is mounted on the pin by means of a ball joint connection.

The invention also proposes an aircraft having a structure, an engine and a front engine attachment system according to one of the preceding variants, wherein the engine pylon is fixed to the structure, and wherein a front part of the engine is fixed to the at least one second connection point.

BRIEF DESCRIPTION OF THE DRAWINGS

The abovementioned features of the invention, along with others, will become more clearly apparent on reading the following description of one exemplary embodiment, the description being given with reference to the appended drawings, in which.

DETAILED DESCRIPTION OF THE PREFERRED EMBODIMENTS

Figure 1:
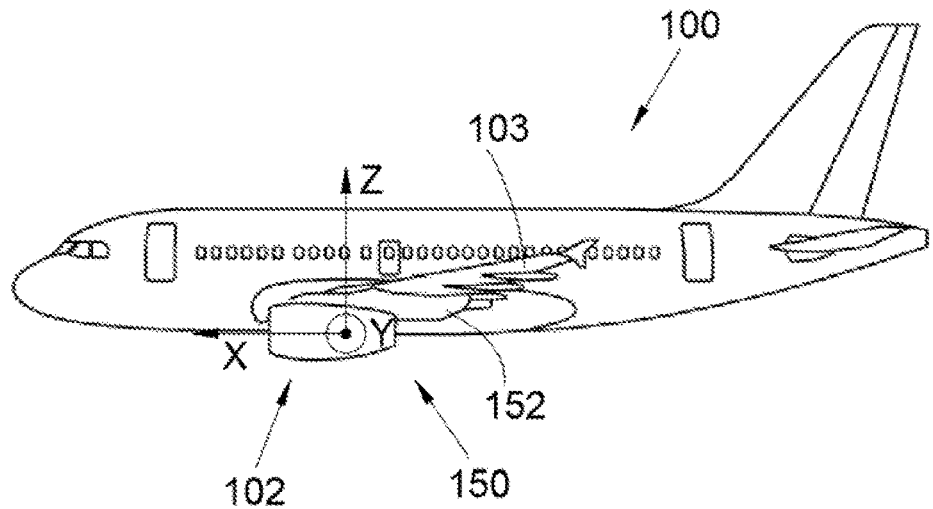
FIG. 1 is a side view of an aircraft according to the invention.

In the following description, terms relating to a position are considered in relation to an aircraft in a position of forward movement, i.e. as shown in FIG. 1.

FIG. 1 shows an aircraft 100, which has an engine 102, in particular a turbojet.

In the following description, and by convention, the X direction is the longitudinal direction of the engine 102, with positive orientation in the direction of forward movement of the aircraft 100, the Y direction is the transverse direction of the engine 102, which is horizontal when the aircraft is on the ground, and the Z direction is the vertical direction or vertical height when the aircraft is on the ground, these three directions X, Y and Z being mutually orthogonal.

In the embodiment of the invention that is shown in FIG. 1, the aircraft 100 has an engine 102 beneath each wing 103, but it is possible to provide a plurality of engines beneath each wing 103.

Beneath each wing 103, and for each engine 102, the aircraft 100 has a front engine attachment system 150 that is fixed to the structure of the wing 103 and extends beneath the wing 103 and supports the front part of the engine 102.

Figure 2:
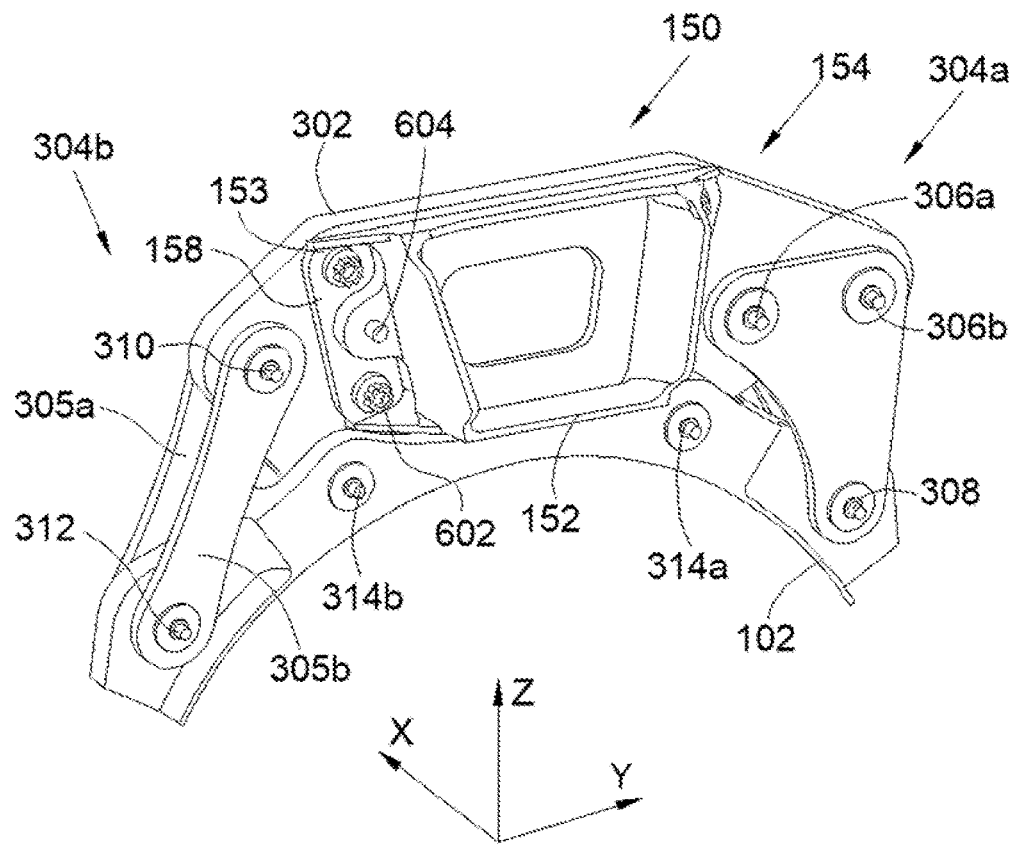
FIG. 2 is a perspective view of a front engine attachment system according to the invention.
Figure 3:
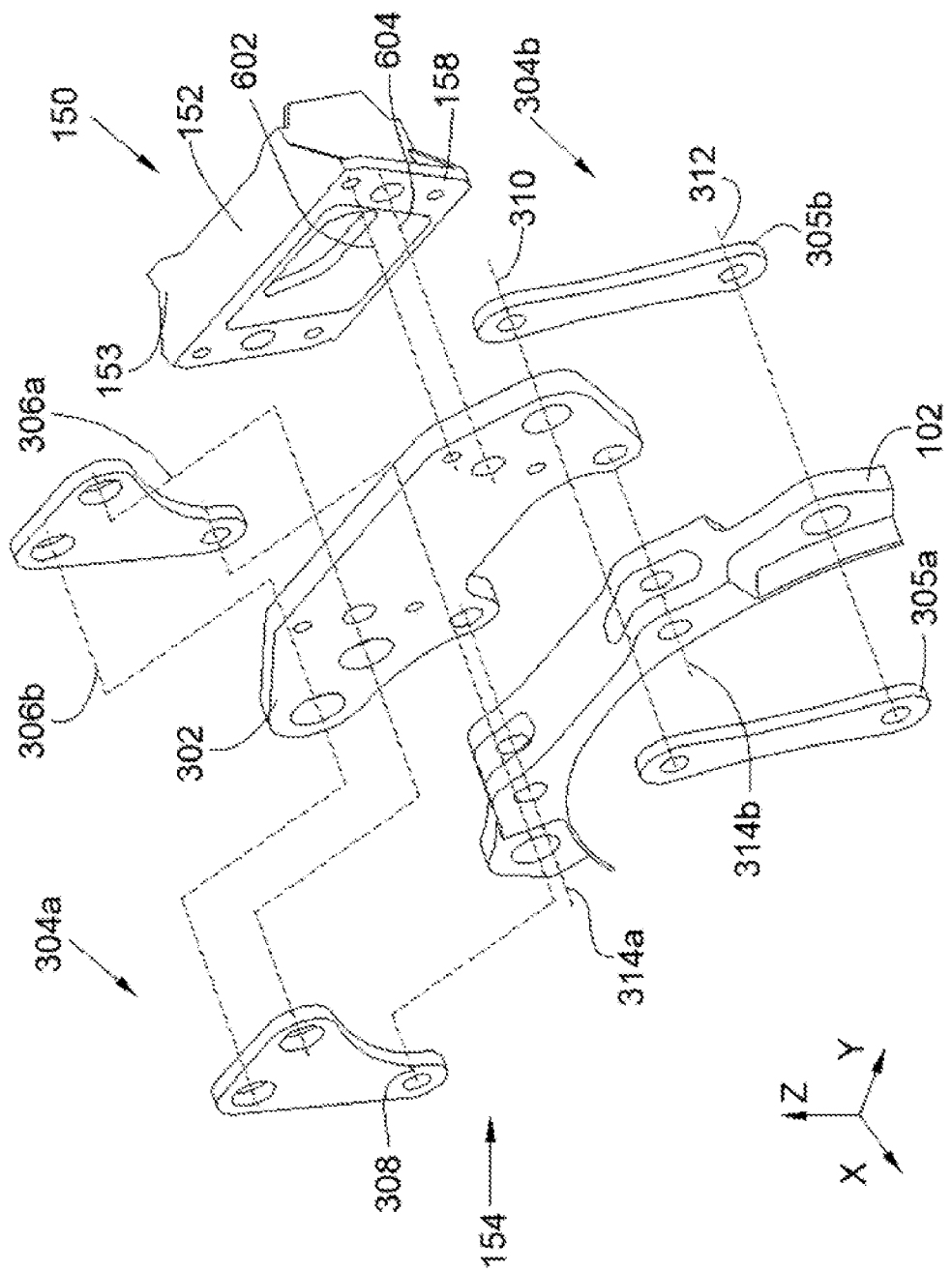
FIG. 3 is an exploded perspective view of the front engine attachment system in FIG. 2.

As shown in FIGS. 2 and 3, the front engine attachment system 150 comprises an engine pylon 152, which is fixed to the wing 103, and a front engine attachment 154, which is fixed to the engine pylon 152 and to which is fixed the front part of the engine 102.

In a known manner, the engine pylon 152 takes, for example, the form of a box that has, inter alia, in its front part, a frontal part 153 that extends in a substantially vertical plane.

The front engine attachment 154 has a beam 302 to which is fixed, on either side of a median plane XZ, a rod system 304a-b.

In the embodiment of the invention shown here, the frontal part 153 has an attachment wall 158 that has a front face oriented toward the front of the aircraft 100.

According to the invention, the beam 302 is made up of a plate pressed against the front face of the attachment wall 158.

The plate extends in a plane that is parallel to the front face of the attachment wall 158.

The beam 302 is fixed against the front face of the attachment wall 158, in this case using bolts 602 that pass through a bore in the beam 302 and a bore in the attachment wall 158.

The front engine attachment system 150 also has, in this case, shear pins 604 that pass through a bore in the attachment wall 158 and a bore in the beam 302.

Each rod system 304a-b comprises a front rod 305a and a rear rod 305b. The two rods 305a-b are mutually parallel and the front rod 305a is disposed in front of the rear rod 305b in the longitudinal X direction.

Each rod 305a-b is in a plane that is generally parallel to the front face of the attachment wall 158.

Each rod system 304a-b is fixed to the beam 302 in an articulated manner by at least one first connection point 306a-b, 310, and is fixed to a front part of the engine 102, which is shown here by a part of its front casing, in an articulated manner by at least one second connection point 308, 312.

In the embodiment of the invention shown here, the first rod system 304a is fixed to the beam 302 by two first connection points 306a-b and to the engine 102 by a second connection point 308, and the second rod system 304b is fixed to the beam 302 by a first connection point 310 and to the engine 102 by a second connection point 312.

For each connection point 306a-b, 310, 308, 312, the connection between the rod system 304a-b and the beam 302, and, respectively, the engine 102, is realized by a clevis, wherein each rod 305a-b of the rod system 304a-b forms a wall of the clevis, wherein the beam 302, or the engine 102, is disposed between the two rods 305a-b, wherein a pin passes through a bore in each rod 305a-b and a bore in the beam 302, or the engine 102, and wherein the beam 302, or the engine 102, is mounted on the pin by way of a ball joint connection.

Figure 4:
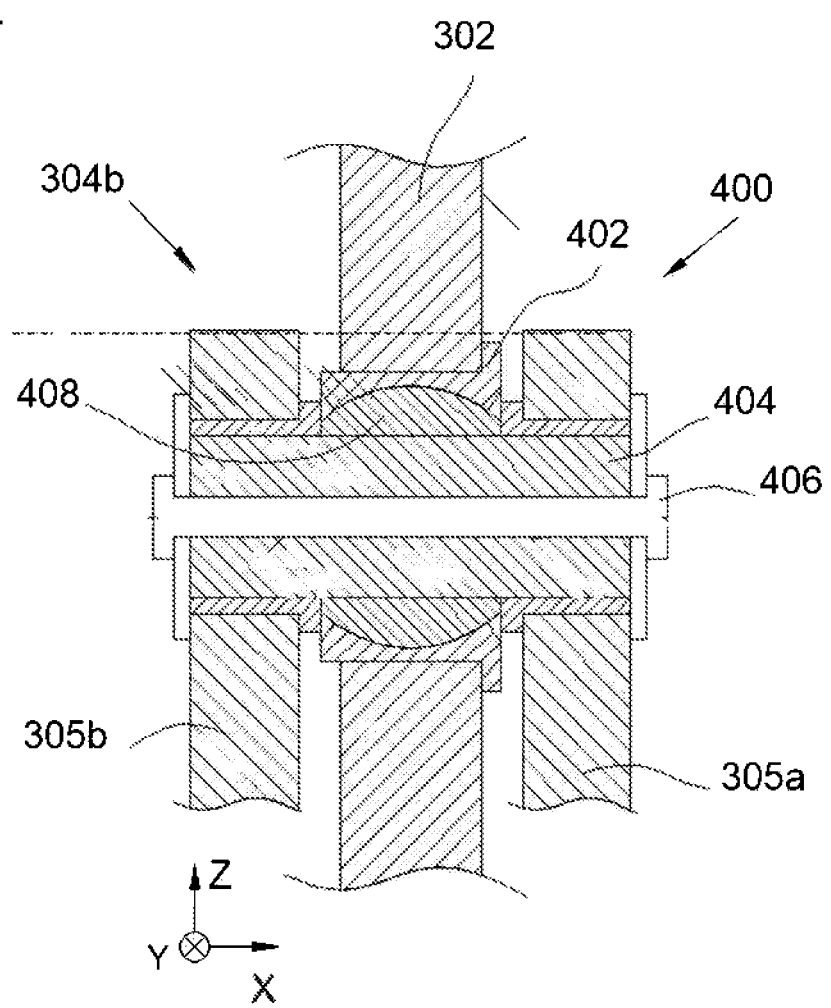
FIG. 4 is a cross-sectional view of a ball joint system at a connection point.

FIG. 4 shows a ball joint system 400 at the first connection point 310 between the rod system 304b and the beam 302. The other connection points can take the same form, in particular at the engine 102.

The ball joint system 400 comprises a cage 402, which is fixed inside the bore in the beam 302, for example by screwing, and the pin 404, which is fitted and fixed in the bore in the beam 302 and in the bores in the rods 305a-b, in this case by way of bushings and a bolt 406 that sandwiches the rods 305a-b, in this case by way of washers.

The cage 402 has a spherical inner surface and the pin 404 bears a spherical central boss 408 around which the cage 402 is disposed. Thus, there is freedom of movement between the rods 305a-b and the beam 302, being the beam 302 the cage 402 being able to pivot about the central portion 408.

Such an arrangement allows more robust behavior by protecting the housing from frictional wear, ensures easier dismantling if need be, and promotes simplification of the structure of the beam 302.

Thus, in the embodiment of the invention shown here, each first connection point 306a-b, 310 between the beam 302 and a rod system 304a-b takes the form of a clevis, wherein one wall of the clevis is made up of the front rod 305a of the rod system 304a-b, wherein the other wall of the clevis is made up of the rear rod 305b of the rod system 304a-b, wherein the beam 302 is disposed between the two rods 305a-b, and wherein a pin passes through a bore in each rod 305a-b and a bore in the beam 302.

In the same way, in the embodiment of the invention shown here, each second connection point 308, 312 between the engine 102 and a rod system 304a-b takes the form of a clevis, wherein one wall of the clevis is made up of the front rod 305a of the rod system 304a-b, wherein the other wall of the clevis is made up of the rear rod 305b of the rod system 304a-b, wherein the engine 102 is disposed between the two rods 305a-b, and wherein a pin passes through a bore in each rod 305a-b and a bore in the engine 102.

Each rod system 304a-b, the beam 302 and the frontal part 153 define, in combination, a primary load path between the engine 102 and the engine pylon 152, so as to withstand the loads of the engine 102 under normal operating conditions of the engine 102.

For enhanced safety, the front engine attachment system 150 has, for each rod system 304a-b, an additional connection point 314a-b. The additional connection points 314a-b are disposed on either side of the median plane XZ, and each establish an additional connection between the front engine attachment system 150 and the engine 102. Each additional connection point 314a-b takes the form of a backup safety fixing point (or "waiting fail-safe") that will compensate a failure of the primary load path, i.e., of at least one of the rods 305a-b. This means that when an element of the primary load path is damaged, the activation of a backup safety fixing point creates an auxiliary load path between the engine 102 and the engine pylon 152.

Each backup safety fixing point 314a-b is, in this case, made up of a clevis provided in the engine 102 and a pin that is fitted into bores in the clevis and that passes through a bore in the beam 302, of which the diameter is greater than the diameter of the pin. Thus, in normal operation there is no contact between the pin and the beam 302, and in the event of one of the rods 305a-b breaking, the engine 102 will move and the pin will then come into contact with the beam 302.

For each of the clevises described above, the pin of the clevis is generally parallel to the longitudinal X direction.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A front engine attachment system for an engine of an aircraft, the front engine attachment system having:
   an engine pylon having, in its front part, a frontal part having an attachment wall that has a front face, and
   a front engine attachment having a beam that is fixed against the front face and to which is fixed, on either side of a median plane, a rod system,
   wherein each rod system is fixed to the beam in an articulated manner by at least one first connection point, and is configured to be fixed to a front part of the engine in an articulated manner by at least one second connection point,
   wherein each rod system comprises a front rod and a rear rod, wherein each first connection point between the beam and the rod system takes the form of a clevis,
   wherein one wall of said clevis is made up of the front rod of said rod system,
   wherein another wall of said clevis is made up of the rear rod of said rod system,
   wherein the beam is disposed between the front and rear rods, and wherein a pin passes through a bore in each rod and a bore in the beam,
   wherein the front engine attachment system has, for each rod system, a backup safety fixing point that is activated upon a failure of a primary load path and that creates an auxiliary load path between the engine and the engine pylon,
   wherein each backup safety fixing point is made up of a clevis provided in the engine and a pin that is fitted into bores in said clevis and that passes through a bore in the beam, of which a diameter is greater than a diameter of the pin.

2. The front engine attachment system according to claim 1, wherein the beam is mounted on the pin by means of a ball joint connection.

3. An aircraft having a structure, an engine and a front engine attachment system according to claim 1, wherein the engine pylon is fixed to the structure, and wherein a front part of the engine is fixed to said at least one second connection point.

* * * * *